(12) United States Patent
Fukaya

(10) Patent No.: US 11,988,306 B2
(45) Date of Patent: May 21, 2024

(54) JOINING STRUCTURE, PIPE JOINT, AND METHOD FOR FORMING JOINING STRUCTURE

(71) Applicant: IHARA SCIENCE CORPORATION, Tokyo (JP)

(72) Inventor: Shinji Fukaya, Nakatsugawa (JP)

(73) Assignee: IHARA SCIENCE CORPORATION, Tokyo (JP)

( * ) Notice: Subject to any disclaimer, the term of this patent is extended or adjusted under 35 U.S.C. 154(b) by 333 days.

(21) Appl. No.: 17/269,302

(22) PCT Filed: Aug. 1, 2019

(86) PCT No.: PCT/JP2019/030250
§ 371 (c)(1),
(2) Date: Feb. 18, 2021

(87) PCT Pub. No.: WO2020/054243
PCT Pub. Date: Mar. 19, 2020

(65) Prior Publication Data
US 2021/0215282 A1 Jul. 15, 2021

(30) Foreign Application Priority Data

Sep. 12, 2018 (JP) .................. 2018-170430

(51) Int. Cl.
*F16L 19/065* (2006.01)
*F16L 19/08* (2006.01)

(52) U.S. Cl.
CPC ............. *F16L 19/065* (2013.01); *F16L 19/08* (2013.01)

(58) Field of Classification Search
CPC ........ F16L 19/041; F16L 19/045; F16L 19/08
See application file for complete search history.

(56) References Cited

U.S. PATENT DOCUMENTS

| | | | | |
|---|---|---|---|---|
| 1,823,061 A | * | 9/1931 | Pearson ................ | F16L 19/08 285/382.7 |
| 4,095,826 A | * | 6/1978 | Borradori .............. | F16L 19/08 285/423 |
| 5,242,199 A | | 9/1993 | Hann et al. | |
| 2007/0126231 A1 | * | 6/2007 | Thompson ............. | F16L 19/08 285/249 |

(Continued)

FOREIGN PATENT DOCUMENTS

| | | |
|---|---|---|
| CN | 101305232 | 11/2008 |
| DE | 930252 | 7/1955 |

(Continued)

OTHER PUBLICATIONS

Office Action issued in JP patent Applcaition No. 2018-170430, dated Sep. 26, 2019.

(Continued)

*Primary Examiner* — Zachary T Dragicevich
(74) *Attorney, Agent, or Firm* — DLA Piper LLP (US)

(57) ABSTRACT

A joining structure airtightly or liquid-tightly joins an outer peripheral surface of the pipe member and an inner peripheral surface of a cylindrical member to be mounted on the pipe member, and the pipe member and the cylindrical member are made inseparable by an annular protrusion formed on the inner peripheral surface of the cylindrical member.

4 Claims, 22 Drawing Sheets

(56) References Cited

U.S. PATENT DOCUMENTS

| | | | | |
|---|---|---|---|---|
| 2009/0224536 | A1* | 9/2009 | Fukushima | F16L 19/045 |
| | | | | 285/327 |
| 2009/0261573 | A1 | 10/2009 | Nakata | |
| 2015/0061283 | A1* | 3/2015 | Peirce | F16L 19/041 |
| | | | | 285/291.1 |

FOREIGN PATENT DOCUMENTS

| | | |
|---|---|---|
| DE | 2850927 | 5/1979 |
| DE | 9106270 | 1/1992 |
| EP | 0439749 | 8/1991 |
| FR | 2255540 | 7/1975 |
| GB | 1157868 | 7/1969 |
| JP | 57-134489 U | 8/1982 |
| JP | S59-015825 | 5/1984 |
| JP | 11-290980 | 10/1999 |
| JP | 2001-193876 | 7/2001 |
| JP | 2007-247702 | 9/2007 |
| JP | 2010-025294 | 2/2010 |
| JP | 2017-129266 | 7/2017 |
| KR | 20-1999-0039439 U | 11/1999 |
| KR | 20-1999-0039440 U | 11/1999 |

OTHER PUBLICATIONS

Decision to grant a patent issued in JP Patent Application No. 2018-170430, dated Mar. 3, 2020.

International Search Report in Application No. PCT/JP2019/030250, dated Aug. 10, 2019.

European Search Report in Application No. 19860636.0, dated Apr. 19, 2022.

Chinese Office Action in Application No. 201980053366.6, dated May 7, 2022.

Japanese Office Action in Application No. 2020-066443, dated May 19, 2022.

Korean Office Action in KR Patent Application No. 10-2021-7003621, dated Mar. 20, 2024.

* cited by examiner

JOINING STRUCTURE, PIPE JOINT, AND METHOD FOR FORMING JOINING STRUCTURE

CROSS REFERENCE TO RELATED APPLICATIONS

This application is a U.S. National Stage Application of International Application No. PCT/JP2019/030250 filed Aug. 1, 2019, which claims priority from Japanese Patent Application No. 2018-170430 filed Sep. 12, 2018. The entirety of all the above-listed applications are incorporated herein by reference.

TECHNICAL FIELD

The present invention relates to a joining structure between a pipe member and a cylindrical member mounted on the pipe member, and particularly to a joining structure in which an outer peripheral surface of the pipe member and an inner peripheral surface of the cylindrical member are inseparably joined to each other so as to have the sealability, a method for forming the joining structure, and a pipe joint having the joining structure.

BACKGROUND ART

As a joint structure for piping members, as shown in Patent Literature 1, there is a method of welding and joining a pair of piping members.

However, the joining of piping by welding has its own problem that post-treatment including various preparatory work, bead removal after welding, and pickling of pipes is needed, which leads to a long lead time and an increase in cost.

CITATION LIST

Patent Literature

Patent Literature 1: JP 2007-247702 A

SUMMARY OF INVENTION

Technical Problem

The present invention has been made to solve the above-described problem, and main expected purpose thereof is to enable a pipe member and a pipe joint to be more firmly joined than before without using welding.

Solution to Problem

FIG. 19 is a schematic view illustrating the principle of the present invention, and relates to a joining structure between an outer peripheral surface of a pipe member P and a cylindrical member C mounted on the outer peripheral surface. Specifically, as illustrated in an upper drawing, annular protrusions t are formed on an inner peripheral surface of the cylindrical member C, and a pressing means Pr is provided that presses a predetermined axial width d on the outer peripheral surface of the cylindrical member C radially inward.

A lower part of FIG. 19 shows that the annular protrusions t gradually bite into the outer peripheral surface of the pipe member P by radially inward force while the pressing means Pr is moved to a right side as indicated by a broken line.

That is, the joining structure according to the present invention to which this principle is applied is a joining structure that airtightly or liquid-tightly joins an outer peripheral surface of a pipe member and an inner peripheral surface of a cylindrical member to be mounted on the pipe member, characterized in that an annular protrusion is formed on the inner peripheral surface of the cylindrical member, and the pipe member and the cylindrical member are inseparable.

As described above, since the annular protrusion is formed on the inner peripheral surface of the tubular member, the annular protrusion bites into the outer peripheral surface of the pipe member, so that a firmer joining structure than before can be obtained without using welding.

Furthermore, the pipe joint according to the present invention is joined to the pipe member, and is characterized by being included, together with the pipe member, in the above-described joining structure.

If such a pipe joint is used, it is possible to obtain the above-described joining structure, and the pipe joint can be firmly joined to the pipe member without using welding.

A specific embodiment of the pipe joint can be the pipe joint including a first member in which a housing space for housing the pipe member is formed, the cylindrical member interposed between the outer peripheral surface of the pipe member and an inner peripheral surface (hereinafter referred to as a housing surface) of the first member forming the housing space, and a pushing member that applies axial force to the cylindrical member.

In order to allow the annular protrusion formed on the inner peripheral surface of the cylindrical member to bite into the outer peripheral surface of the pipe member, it is preferable that the cylindrical member is configured to generate radially inward force by the axial force of the pushing member.

Here, a configuration of FIG. 18 illustrating main points of the pipe joint (a joint body as the first member, the cylindrical member, and a nut as the pushing member) will be examined.

When this pipe joint is used, first, with the cylindrical member mounted on the pipe member, these are inserted into the joint body, and the nut, which is the pushing member, is screwed to the joint body from a rear side of the cylindrical member. As a result, the cylindrical member can be pushed between the outer peripheral surface of the pipe member and the inner peripheral surface of the joint body.

Here, the inner peripheral surface of the joint body and the outer peripheral surface of the cylindrical member are inclined so as to gradually reduce the diameter toward an insertion direction of the pipe member, and a plurality of protrusions is provided on the inner peripheral surface of the cylindrical member. As a result, when the cylindrical member is pushed toward the joint body, the cylindrical member is crushed radially inward, and the protrusions bite into the pipe member.

However, if the inner peripheral surface of the joint body and the outer peripheral surface of the cylindrical member are inclined, as illustrated in FIG. 18, the number of annular protrusions involved in the bite increases sharply when force for pushing the cylindrical member is increased, and thus force resisting the pushing force also increases sharply. In other words, the plurality of annular protrusions that bites into the pipe member acts as resistance at the same time, and thus the pushing force is larger. Therefore, tightening torque required to screw the nut to the joint body increases, and if the tightening torque is insufficient and the cylindrical member cannot be crushed until a sufficient crimping property is obtained, the pipe member comes off from the pipe joint.

The larger the diameter dimension of the pipe member, the larger the required tightening torque, and thus the above-described problem is more noticeable.

Therefore, in order to solve the above-described problem, it is preferable that the first member is formed with a force concentrating portion that concentrates the radially inward force on a part of the outer peripheral surface of the cylindrical member.

With such a configuration, the radially inward force generated by the axial force applied to the cylindrical member can be concentrated on a part of the outer peripheral surface of the cylindrical member. Thus, it is possible to reduce resistance when the cylindrical member is pushed, and as illustrated in the schematic view of FIG. 19, the annular protrusions formed on the inner peripheral surface of the cylindrical member can bite into the outer peripheral surface of the pipe member one by one, for example.

As a result, force required to push the cylindrical member (for example, tightening torque when the nut is used) can be reduced, and thus the pipe joint according to the present invention can be applied to a large-diameter pipe member as well.

It is preferable that the force concentrating portion is a part of the housing surface and is a bulging surface that bulges radially inward.

In this case, force can be concentrated on the outer peripheral surface of the cylindrical member with a simple configuration.

It is preferable that, on a cross section parallel to an axial direction of the cylindrical member, a plurality of the annular protrusions is provided along the axial direction, and the plurality of annular protrusions is configured to bite into the outer peripheral surface of the pipe member one by one along the axial direction by the radially inward force generated in the cylindrical member.

With such a configuration, the force required to crush the cylindrical member is smaller than in a configuration in which the plurality of annular protrusions bites into the outer peripheral surface of the pipe member at once, and the force required to push the cylindrical member can be further reduced.

The plurality of annular protrusions can be the plurality of annular protrusions that forms a spiral shape formed continuously or annular shapes formed discontinuously.

With such annular protrusions, the crimping property and the sealability between the pipe member and the pipe joint can be improved.

An example of a specific configuration of the pushing member can be a configuration in which a nut screwed to the first member, and a cylindrical element that receives axial force from the nut and presses the cylindrical member toward the first member are included.

Furthermore, a method for forming a joining structure according to the present invention is a method for forming a joining structure that airtightly or liquid-tightly joins an outer peripheral surface of a pipe member and an inner peripheral surface of a cylindrical member to be mounted on the pipe member, the method being characterized by including a first step of mounting, on the pipe member, the cylindrical member having an annular protrusion on the inner peripheral surface, a second step of pressing a predetermined axial width of the cylindrical member radially inward, and a third step of causing the annular protrusion formed in the predetermined axial width of the cylindrical member to bite into the outer peripheral surface of the pipe member by the radially inward press.

When the joining structure is formed in this way, the annular protrusion formed on the inner peripheral surface of the cylindrical member bites into the outer peripheral surface of the pipe member, and thus it is possible to obtain a firmer joining structure than before without using welding.

It is preferable to further include a fourth step of shifting, along an axial direction, a region of the cylindrical member to be pressed radially inward in the second step.

In this case, the annular protrusion formed on the inner peripheral surface of the cylindrical member can gradually bite into the outer peripheral surface of the pipe member, and the force required to push the cylindrical member can be reduced.

Advantageous Effects of Invention

According to the above-described present invention, it is possible to join a pipe member and a pipe joint more firmly than before without using welding, and reducing force required to push a cylindrical member makes it possible to use the pipe joint for connecting large-diameter pipe members.

DESCRIPTION OF EMBODIMENTS

Hereinafter, an embodiment of the present invention will be described with reference to the drawings.

Figure 1:
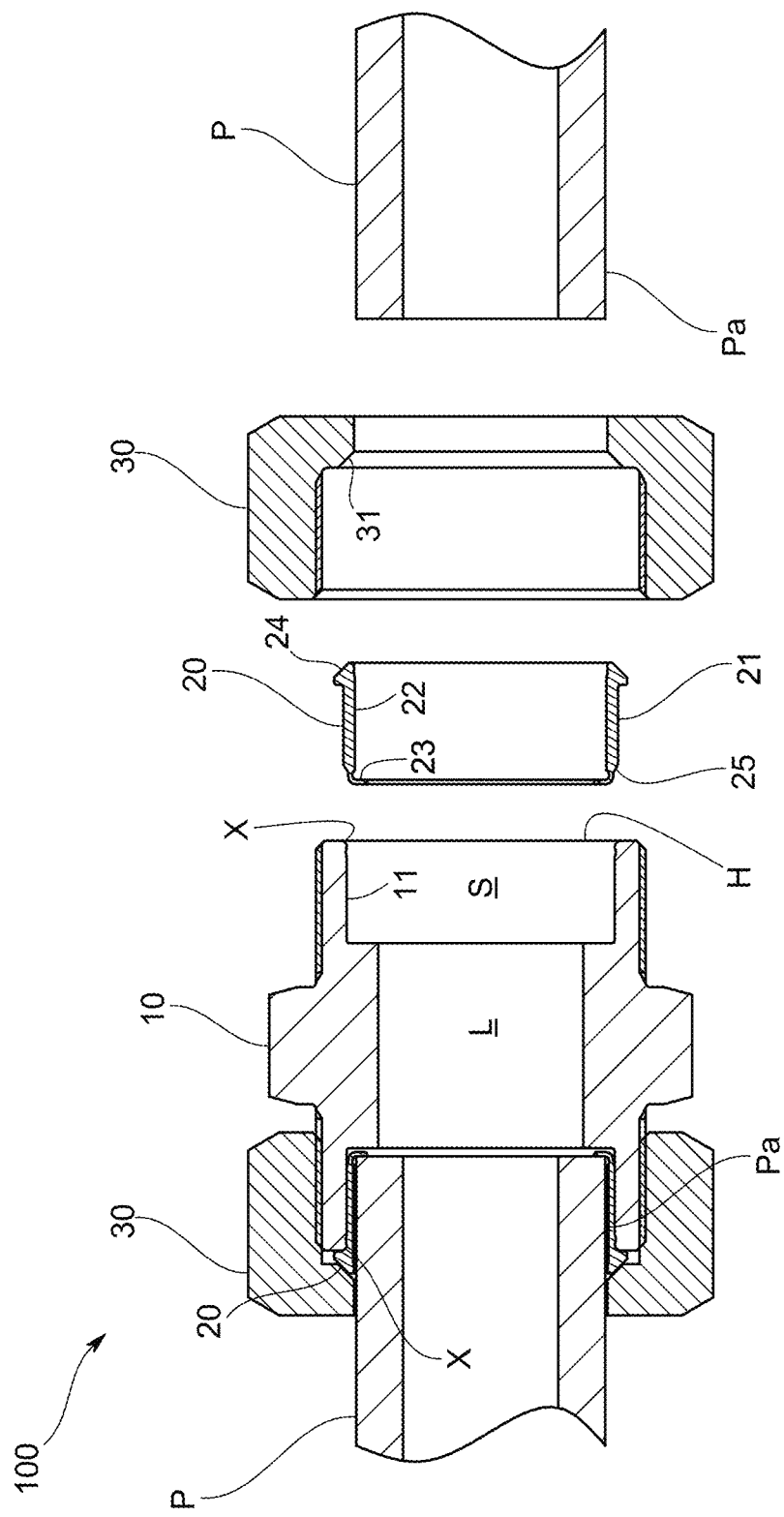
FIG. 1 is an exploded sectional view illustrating a configuration of a pipe joint in one embodiment of the present invention.

A pipe member P is connected to a pipe joint 100 of the present embodiment, and specifically, as illustrated in FIG. 1, the pipe joint 100 includes a joint body 10, which is a first member formed with an insertion port H into which a part of the pipe member P (here, pipe end Pa) is inserted, a cylindrical member 20 mounted on the pipe end Pa, and a pushing member 30 that pushes the cylindrical member 20 toward the joint body 10. The pipe joint 100 here connects a pair of pipe members P having their pipe ends Pa facing each other, and includes the cylindrical member 20 and the pushing member 30 used for each pipe member P.

Note that a configuration illustrated in FIG. 1 illustrates a state where one (left) pipe member P is already connected to the pipe joint 100 and another (right) pipe member P is not connected to the pipe joint 100.

The pipe members P are connected to the joint body 10 while fluid is allowed to flow between the pipe members P, and the joint body 10 is formed with, as illustrated in FIG. 1, housing spaces S for housing the pipe ends Pa inserted via the insertion ports H. The joint body 10 here connects the pair of pipe members P, and the pair of housing spaces S corresponding to the pipe ends Pa of the pipe members P and a communication passage L communicating these housing spaces S are formed.

More specifically, the joint body 10 forms a substantially rotating body shape, and the diameter dimension of a portion 11 of an inner peripheral surface that forms the housing space S (hereinafter, also referred to as a housing surface 11) is larger than the diameter dimension of a portion that forms the communication passage L. A step portion is formed between the housing space S and the communication passage L, and the pipe member P inserted into the housing space can be locked by this step portion.

As illustrated in FIG. 1, in a state where the pipe end Pa is housed in the above-described housing space S, the cylindrical member 20 is interposed between the housing surface 11 and an outer peripheral surface of the pipe end Pa, to ensure the adhesion and sealability between these surfaces. The cylindrical member 20 here is designed to be press-fitted into an annular space formed between the housing surface 11 and the outer peripheral surface of the pipe end Pa, and specifically, in a state before the press fitting, the outer diameter (diameter dimension of an outer peripheral surface 21) is slightly larger than the diameter dimension of the housing surface 11, and the inner diameter (diameter dimension of an inner peripheral surface 22) is slightly larger than the diameter dimension of the pipe member P.

More specifically, the cylindrical member 20 has a substantially cylindrical shape, and includes a locking portion 23 that locks a tip end surface of the inserted pipe end Pa, and a pressed surface 24 that is pressed by the pushing member 30 described later. When the pressed surface 24 is pressed with an end surface of the pipe member P being in contact with the locking portion 23, the cylindrical member 20 is configured to be inserted (press-fitted) into the housing space S together with the pipe member P. Note that the pressed surface 24 here is an inclined surface that is inclined with respect to an axial direction, but it is not always necessary to incline the pressed surface 24.

Furthermore, the cylindrical member 20 is provided with a tapered portion 25 whose outer diameter gradually decreases toward a tip (side of the joint body 10). The outer diameter on a tip side of the tapered portion 25 is made smaller than the diameter dimension of the housing surface 11 described above, a tip portion of the cylindrical member 20 can be easily inserted into the housing space S. On the other hand, the outer peripheral surface 21 of the cylindrical member 20 on a rear side of the tapered portion 25 extends along the axial direction without being inclined with respect to the axial direction.

Figure 2:
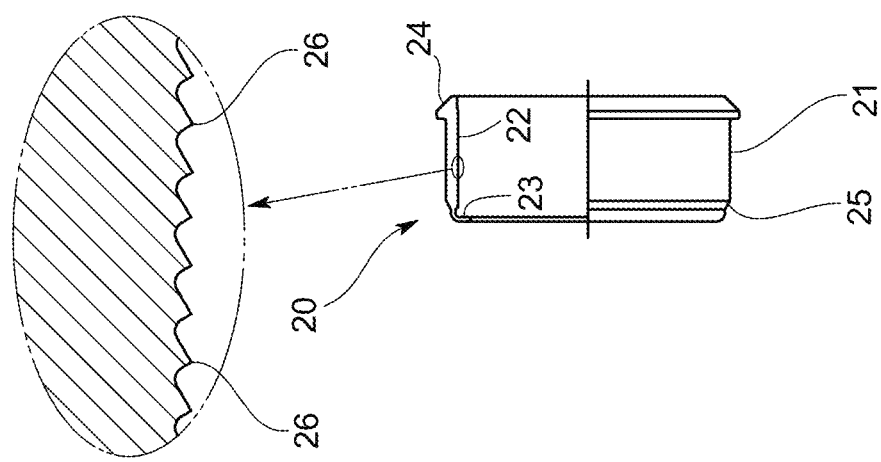
FIG. 2 is a partially enlarged view of an inner peripheral surface of a cylindrical member in the same embodiment.

Furthermore, as illustrated in FIG. 2, the inner peripheral surface 22 of the cylindrical member 20 is provided with annular protrusions 26 that protrude radially inward. The annular protrusions 26 bite into the outer peripheral surface of the pipe end Pa when the cylindrical member 20 is press-fitted between the housing surface 11 and the outer peripheral surface of the pipe end Pa and is crushed in a radial direction. Here, a protruding direction of the annular protrusions 26 is a direction slightly inclined toward the tip side from the radial direction, but the protruding direction is not limited to this, and the annular protrusions may protrude in the radial direction, for example. In the present embodiment, the plurality of annular protrusions 26 is provided on a cross section along the axial direction, and these annular protrusions 26 are formed in a spiral shape as a whole. Note that the annular protrusions 26 may be in annular shapes formed discontinuously on the cross section along the axial direction. Furthermore, the annular protrusions 26 are provided on the inner peripheral surface 22 of the cylindrical member 20 on the rear side of the tapered portion 25, and are not provided on the tapered portion 25.

As illustrated in FIG. 1, the pushing member 30 pushes the cylindrical member 20 toward the joint body 10, and includes a pressing surface 31 that presses the pressed surface 24 of the cylindrical member 20. The pushing member 30 of the present embodiment is a nut through which the pipe member P is inserted and that is screwed to a threaded portion formed on the outer peripheral surface of the joint body 10. Note that the pressing surface 31 is an inclined surface that is inclined with respect to the axial direction in correspondence with the pressed surface 24, but it is not always necessary to incline the pressing surface 31.

As described above, a function of the pushing member 30 can be described, if the cylindrical member 20 is focused on, as pushing the cylindrical member 20 relative to the joint body 10, but the function can be described, if the joint body 10 is focused on, as pulling the joint body 10 relative to the cylindrical member. That is, the pushing member 30 pulls the joint body 10 toward the cylindrical member 20 while shortening a distance from the joint body 10, and at the same time, pushes the cylindrical member 20 into the joint body 10 while shortening the distance from the joint body 10. "Pushing" in this specification is a concept including the both functions (pushing and pulling) described above.

Here, a method of connecting the pipe member P to the pipe joint 100 of the present embodiment will be described.

Figure 3:
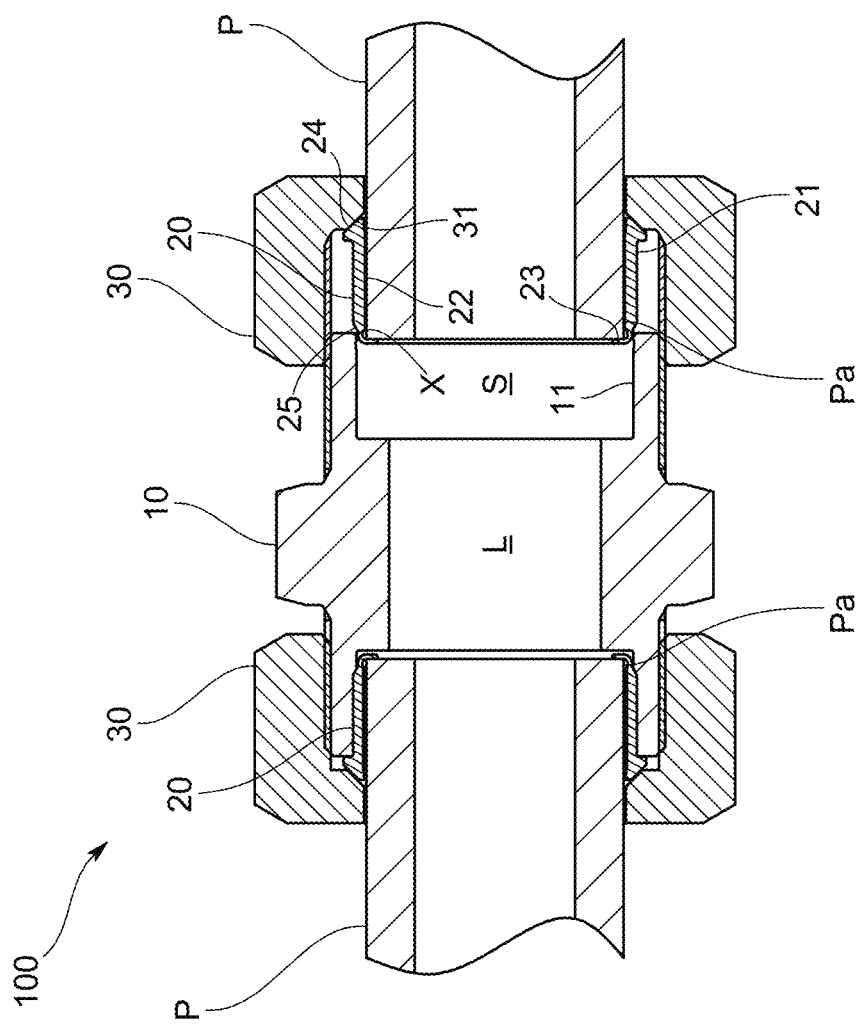
FIG. 3 is a cross-sectional view illustrating a state before connecting the pipe joint and a pipe member in the same embodiment.

First, as illustrated in FIG. 3, the pipe member P to be connected to the pipe joint 100 (pipe member P on a right side in FIG. 3) is passed through the nut, which is the pushing member 30, the pipe end Pa is pressed against the joint body 10 with the cylindrical member 20 mounted on (fitted onto) the pipe end Pa, and the tip portion (specifically, the tapered portion 25) of the cylindrical member 20 is pressed against the insertion port H of the joint body 10.

In this state, the nut, which is the pushing member 30, is screwed to the joint body 10. As a result, the pressing surface 31 of the pushing member 30 presses the pressed surface 24 of the cylindrical member 20, axial force is applied from the pushing member 30 to the cylindrical member 20, and the cylindrical member 20 is press-fitted into the housing space S together with the pipe end Pa while being crushed between the outer peripheral surface of the pipe end Pa and the housing surface 11.

Figure 4A:
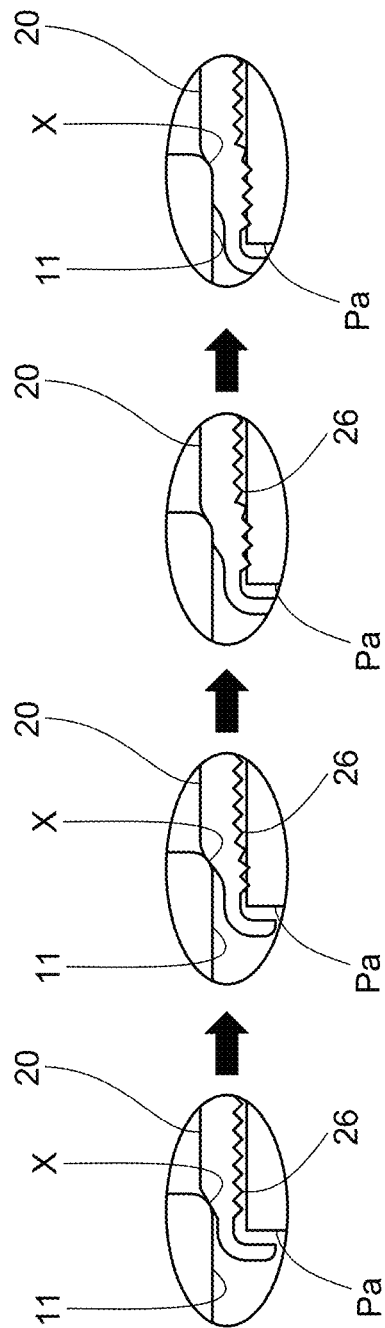
FIG. 4a is a schematic diagram for describing a function of a stress concentrating portion in the same embodiment.

Therefore, as illustrated in FIG. 4a the pipe joint 100 of the present embodiment is configured so that the axial force applied to the cylindrical member 20 is converted into radially inward force, and the radially inward force is concentrated on a part of the outer peripheral surface 21 of the cylindrical member 20.

More specifically, particularly as illustrated in FIG. 4a, the housing surface 11 of the joint body 10 is provided with a force concentrating portion X that converts the axial force applied to the cylindrical member 20 into the radially inward force and concentrates the radially inward force on a part of the outer peripheral surface 21 of the cylindrical member 20. Note that, in FIG. 4a, it seems as if the housing surface 11 of the joint body 10 does not move and the cylindrical member 20 is pushed toward the housing surface 11, but actually the joint body 10 is also pulled toward the cylindrical member 20, as described above.

Figure 4B:
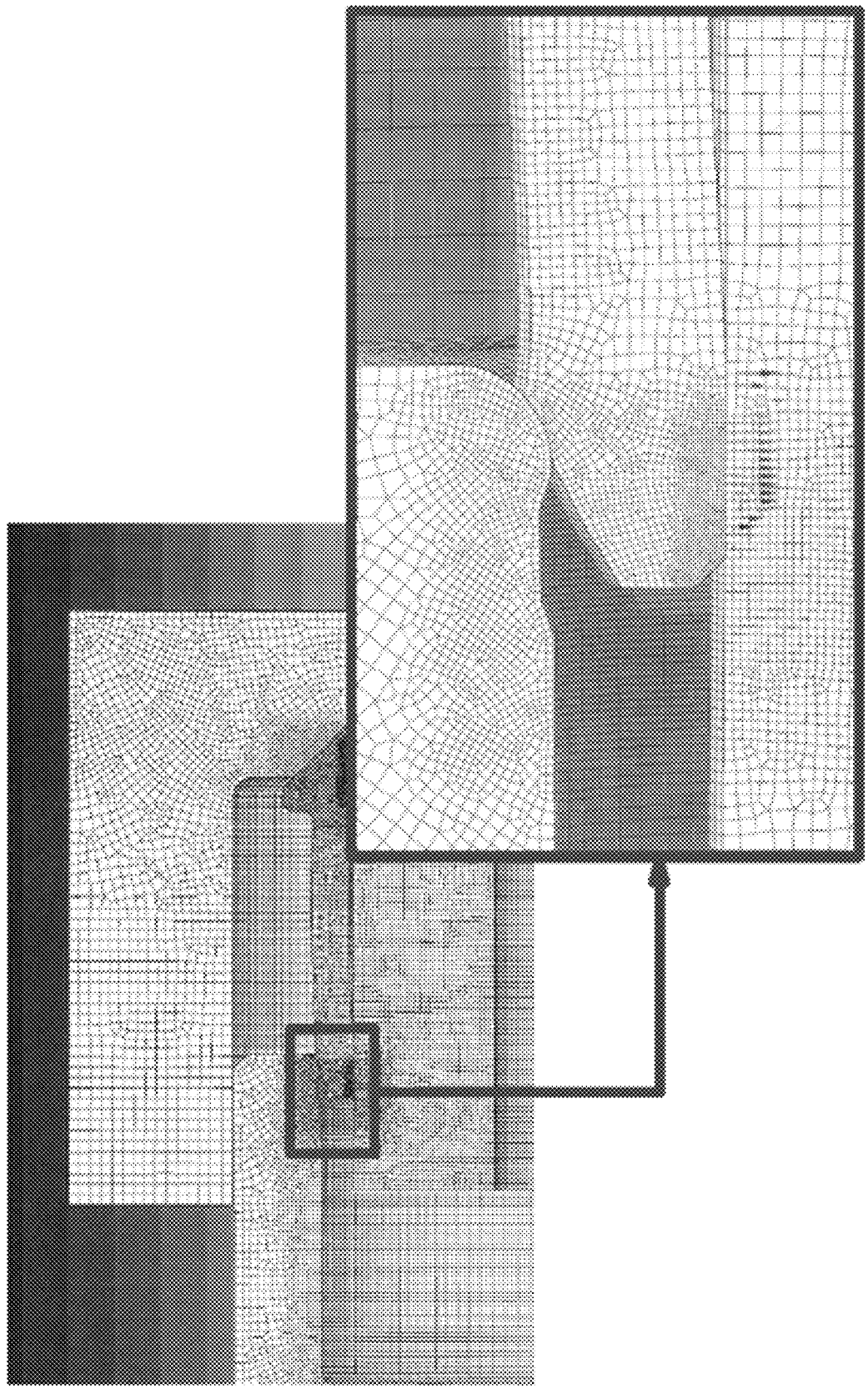
Figure 4C:
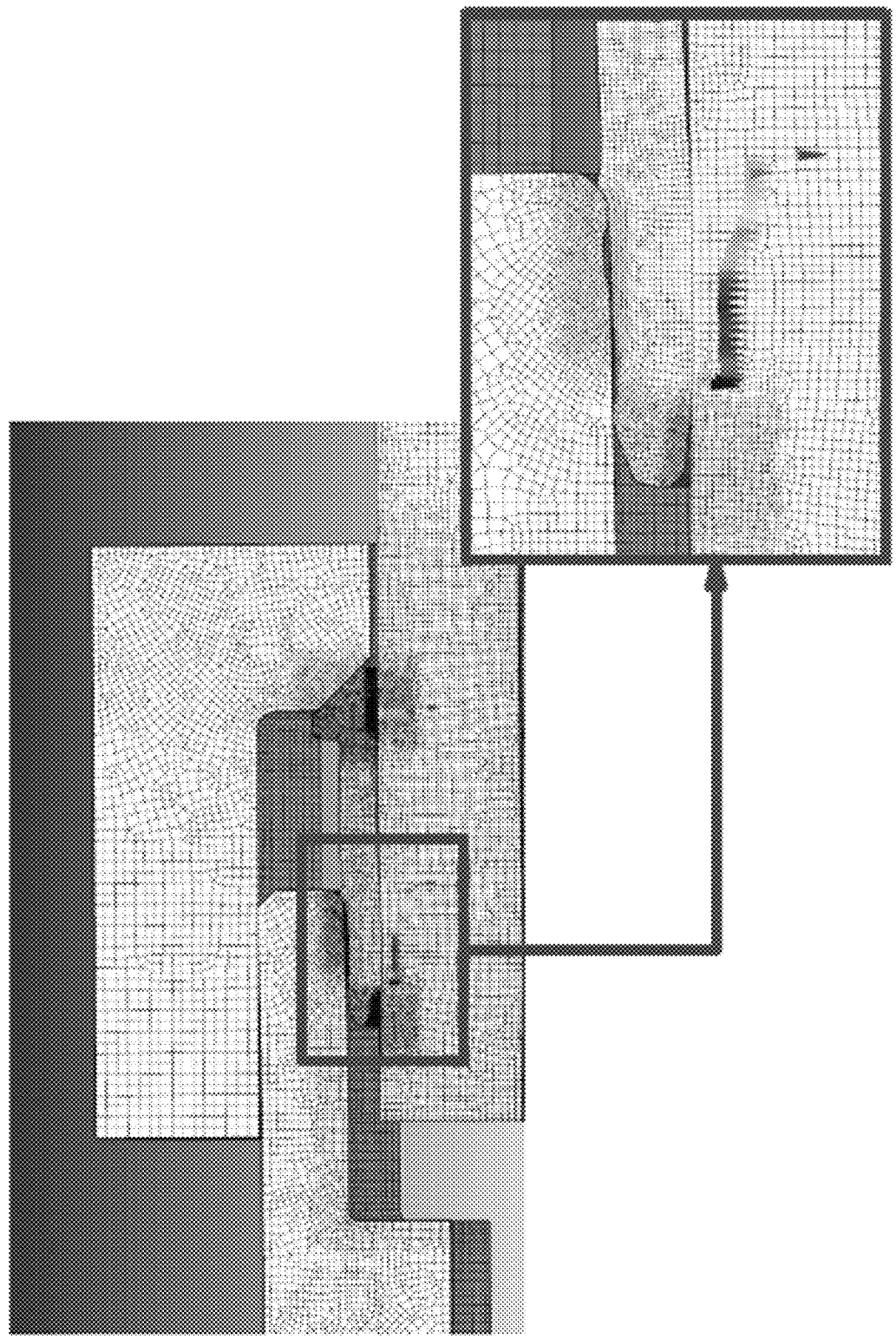

According to the results of FEM analysis of the force applied to the outer peripheral surface 21 of the cylindrical member 20 in this configuration, the force is concentrated on a part of the outer peripheral surface 21 of the cylindrical member 20 by the force concentrating portion X. The FEM analysis establishes that the part where the force is concentrated is approximately opposite the force concentrating portion X and intensifies (e.g., to 700 MPa) as the cylindrical member moves axially. (This can be seen in FIGS. 4b and 4c of International Application No. PCT/JP2019/030250, which has been incorporated by reference herein as noted above, and the publication thereof (WO 2020/054243 A1), which is incorporated by reference herein. Note that the length of arrows in FIGS. 4b and 4c of International Application No. PCT/JP2019/030250 indicate the magnitude of the force applied to the outer peripheral surface of the cylindrical member 20. The longest arrow in the illustrated example corresponds to 700 MPa.)

The force concentrating portion X is, for example, a bulging surface that bulges radially inward from the housing surface 11, and is a surface that receives the tip portion (tapered portion 25) of the cylindrical member 20 in the state of FIG. 3. Note that the force concentrating portion X here is provided in the vicinity of the insertion port H on the housing surface 11, and a portion of the housing surface 11 where the force concentrating portion X is not provided extends along the axial direction without being inclined with respect to the axial direction.

When the axial force applied to the cylindrical member 20 is converted into the radially inward force by the force concentrating portion X and concentrated on a part of the outer peripheral surface 21 of the cylindrical member 20, as illustrated in FIG. 4a, the cylindrical member 20 is crushed and deformed at the place where the force is concentrated, and the annular protrusions 26 formed on the inner peripheral surface 22 of the cylindrical member 20 bite into the outer peripheral surface of the pipe member P.

The force concentrating portion X of the present embodiment is configured so that, by concentrating the radially inward force on a part of the outer peripheral surface 21 of the cylindrical member 20, the plurality of annular protrusions 26 formed on the inner peripheral surface 22 of the cylindrical member 20 gradually (for example, one by one) bites into the outer peripheral surface of the pipe member P along the axial direction.

Figure 5:
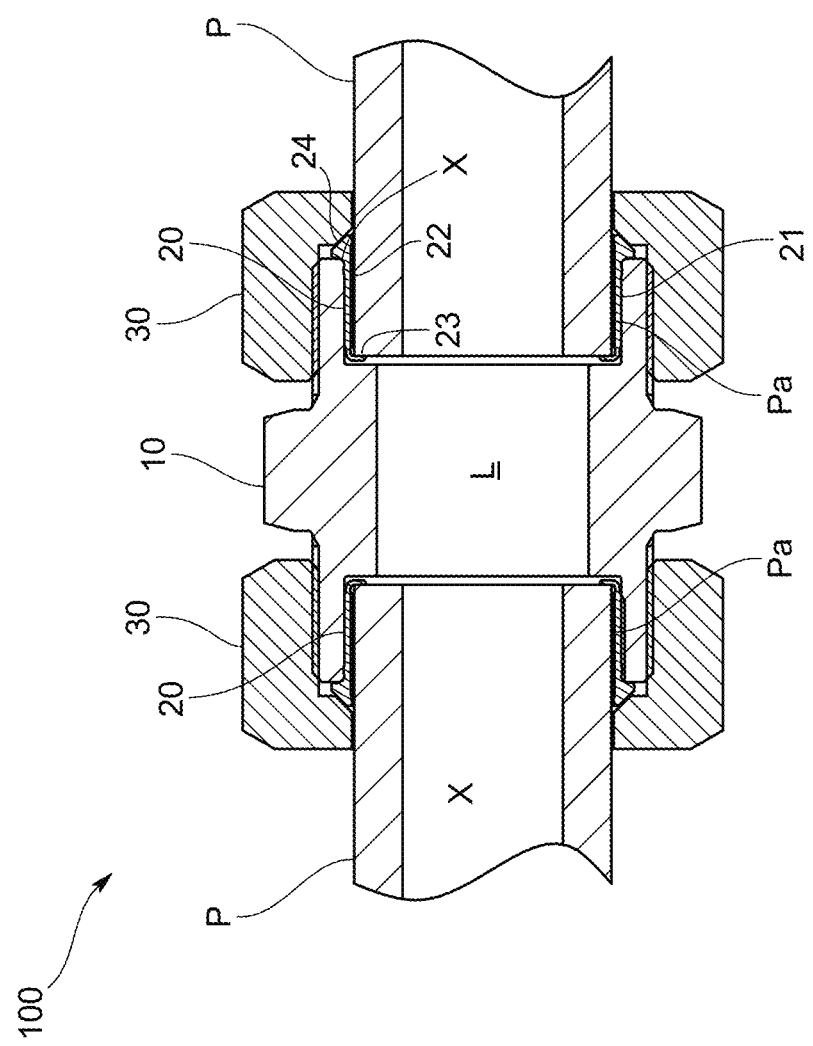
FIG. 5 is a cross-sectional view illustrating a state after connecting the pipe joint and the pipe member in the same embodiment.

As described above, the cylindrical member 20 is pushed toward the joint body 10 until the state illustrated in FIG. 5 while the nut, which is the pushing member 30, is screwed to the joint body 10, so that the cylindrical member 20 is press-fitted into the annular space formed between the housing surface 11 and the outer peripheral surface of the pipe end Pa, and the annular protrusions 26 formed on the inner peripheral surface 22 of the cylindrical member 20 bite into the outer peripheral surface of the pipe end Pa, which firmly joins and connects the pipe member P and the pipe joint 100. As a result, between the outer peripheral surface of the pipe end Pa and the inner peripheral surface 22 of the cylindrical member 20, a joining structure is formed in which the annular protrusions 26 formed on the inner peripheral surface 22 of the cylindrical member 20 is used and that has the sealability (airtightness or liquid-tightness) and is inseparable.

Since the pipe joint 100 configured in this way is provided with the force concentrating portion X so that the annular protrusions 26 formed on the inner peripheral surface 22 of the cylindrical member 20 bite into the outer peripheral surface of the pipe member P one by one along the axial direction, force required to push the cylindrical member 20 (tightening torque of the nut, which is the pushing member 30) can be reduced as compared with a configuration in which the plurality of annular protrusions 26 bites the outer peripheral surface of the pipe member P at once, and for example, the pipe joint 100 can be applied to a large-diameter pipe member P having an outer diameter of about 30 mm.

Furthermore, since the cylindrical member 20 is press-fitted into the annular space formed between the housing surface 11 and the outer peripheral surface of the pipe end Pa, and the annular protrusions 26 formed on the inner peripheral surface 22 of the cylindrical member 20 bite into the outer peripheral surface of the pipe end Pa, it is possible to obtain excellent adhesion and sealability between the housing surface 11 and the outer peripheral surface of the pipe member P.

Figure 6:
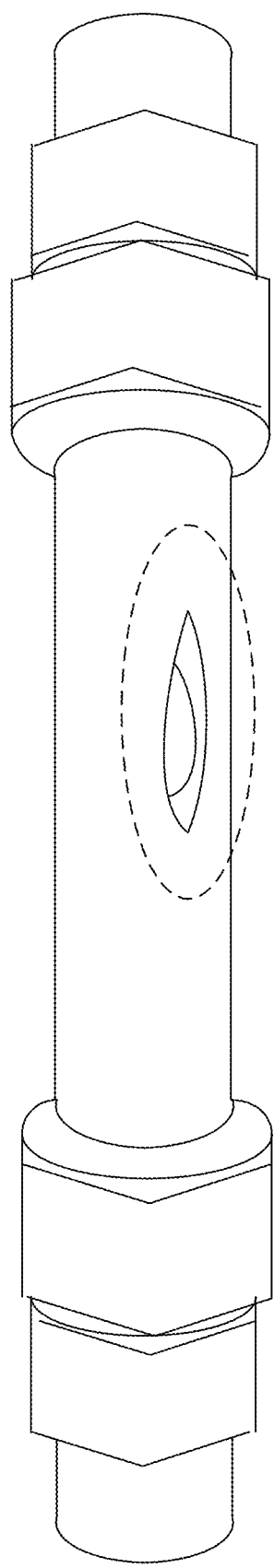
FIG. 6 is a photograph of the pipe member used in an experiment about the adhesion and sealability of the pipe joint in the same embodiment.

The photograph illustrated in FIG. 6 is the proof of this, and illustrates a result of keeping the pipe member P connected to the pipe joint 100 of the present embodiment in a sealed state and continuing to supply pressure oil. That is, in a case where the pipe member P is sealed and the pressure oil is continuously supplied, the pipe member P comes off from the pipe joint 100 if the adhesion between the housing surface 11 and the outer peripheral surface of the pipe member P is insufficient, and the pressure oil continues to leak if the sealability is insufficient, but actually, the pipe member P ruptured (a portion surrounded by a broken line in the photograph). This is proof that extremely high adhesion and sealability are obtained between the housing surface 11 and the outer peripheral surface of the pipe member P. Note that the pipe member P used here is made of carbon steel having an outer diameter of 34 mm and a thickness of 6.4 mm, and has a tensile strength of 500 N/mm$^2$. Note that the breaking pressure was 230 MPa.

Furthermore, a portion of the housing surface 11 other than the force concentrating portion X and the outer peripheral surface 21 of the cylindrical member 20 on the rear side of the tapered portion 25 extend along the axial direction without being inclined with respect to the axial direction, as shown in FIGS. 3 and 5. (This can also be seen in FIG. 4c of International Application No. PCT/JP2019/030250 and the publication thereof (WO 2020/054243 A1), which have been incorporated by reference herein as noted above.) Thus, the radially inward force does not act on the cylindrical member 20 in a portion having passed through the force concentrating portion X of the cylindrical member 20, and deformation of the cylindrical member 20 is suppressed, so that the pushing of the cylindrical member 20 is not hindered. As a result, the force required to push the cylindrical member 20 can be further reduced.

Furthermore, since the annular protrusions 26 formed on the inner peripheral surface 22 of the cylindrical member 20 have a spiral shape as a whole, the annular protrusions 26 bite into the outer peripheral surface of the pipe member P, so that the sealability can be further improved.

Note that the present invention is not limited to the above embodiment.

Figure 7:
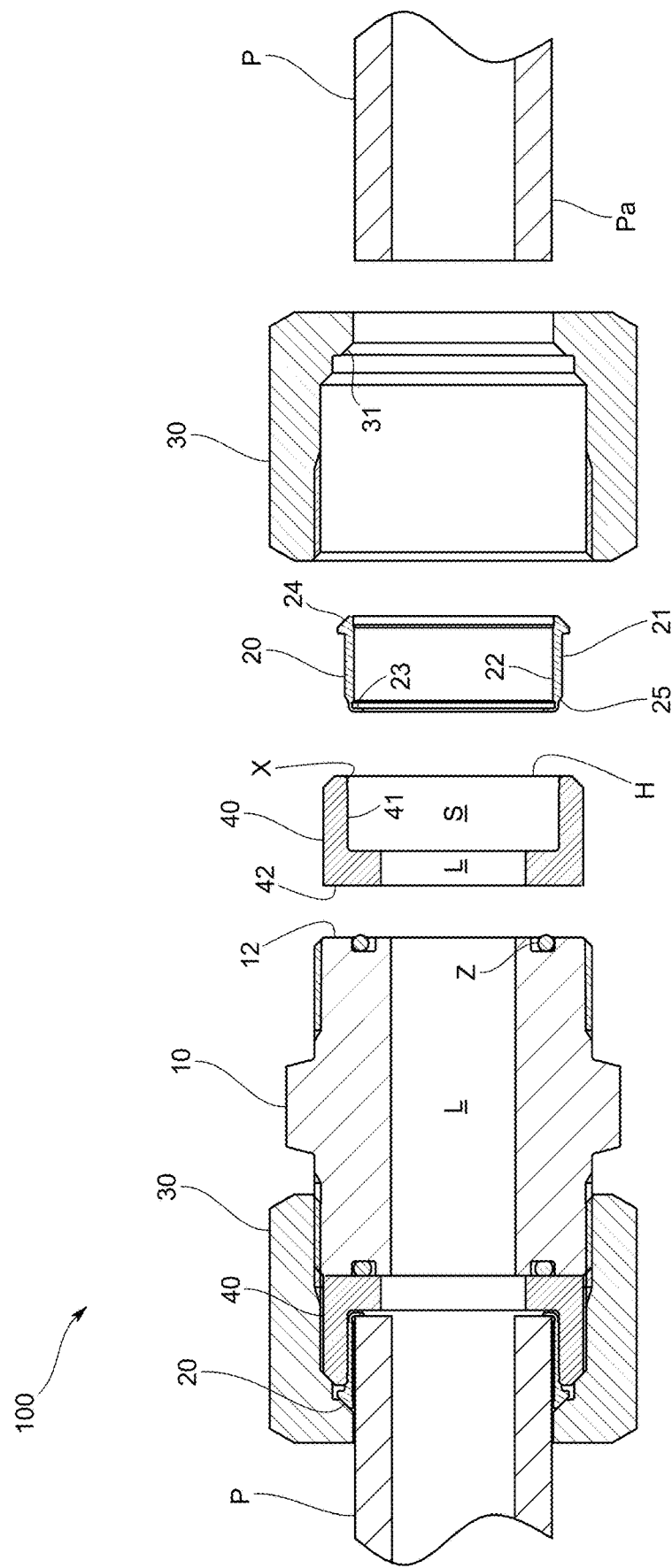
FIG. 7 is a cross-sectional view illustrating a configuration of a first member in another embodiment.

For example, as illustrated in FIG. 7, a first member 40 into which a pipe end Pa is inserted may be a member different from a joint body 10. Specifically, the first member 40 is configured so that a housing space S is formed in which the pipe end Pa is housed, as in the above embodiment, and a cylindrical member 20 is press-fitted between a housing surface 41 forming the housing space S and an outer peripheral surface of the pipe end Pa. Note that a communication passage L communicating with the housing space S is formed here over the first member 40 and the joint body 10.

Figure 8:
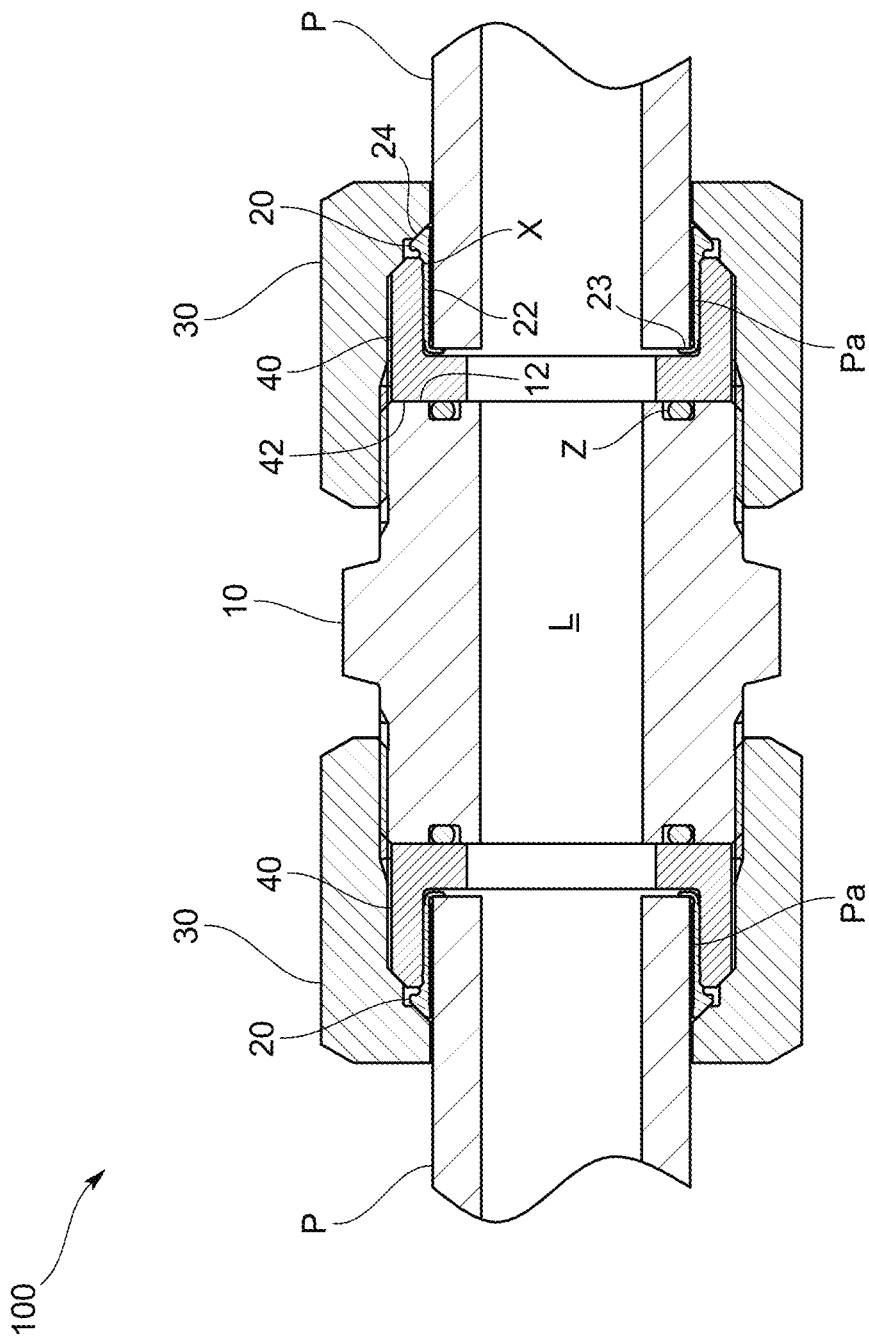
FIG. 8 is a cross-sectional view illustrating a state after connecting a pipe joint and a pipe member in the another embodiment.

As illustrated in FIG. 8, a pipe joint 100 here is configured so that an end surface 12 of the joint body 10 and an end surface 42 of the first member 40 face each other, and at the same time, and these end surfaces 12 and 42 are in close contact with each other via a sealing member Z such as an O-ring. Specifically, as in the above embodiment, a pushing member 30 pushes the cylindrical member 20 toward the first member 40, so that the first member 40 is pushed toward the joint body 10. As a result, the end surface 12 of the joint body 10 and the end surface 42 of the first member 40 come into close contact with each other via the sealing member Z such as an O-ring.

In such a configuration, since the first member 40 is a member different from the joint body 10, the first member 40 can be separated from the joint body 10 when a nut, which is the pushing member 30, is removed from the joint body 10. In other words, the joint body 10 can be moved in a radial direction, the pipe joint 100 that is detachable from a pipe member P can be provided, and the workability in a narrow space or the like can be improved.

Figure 9:
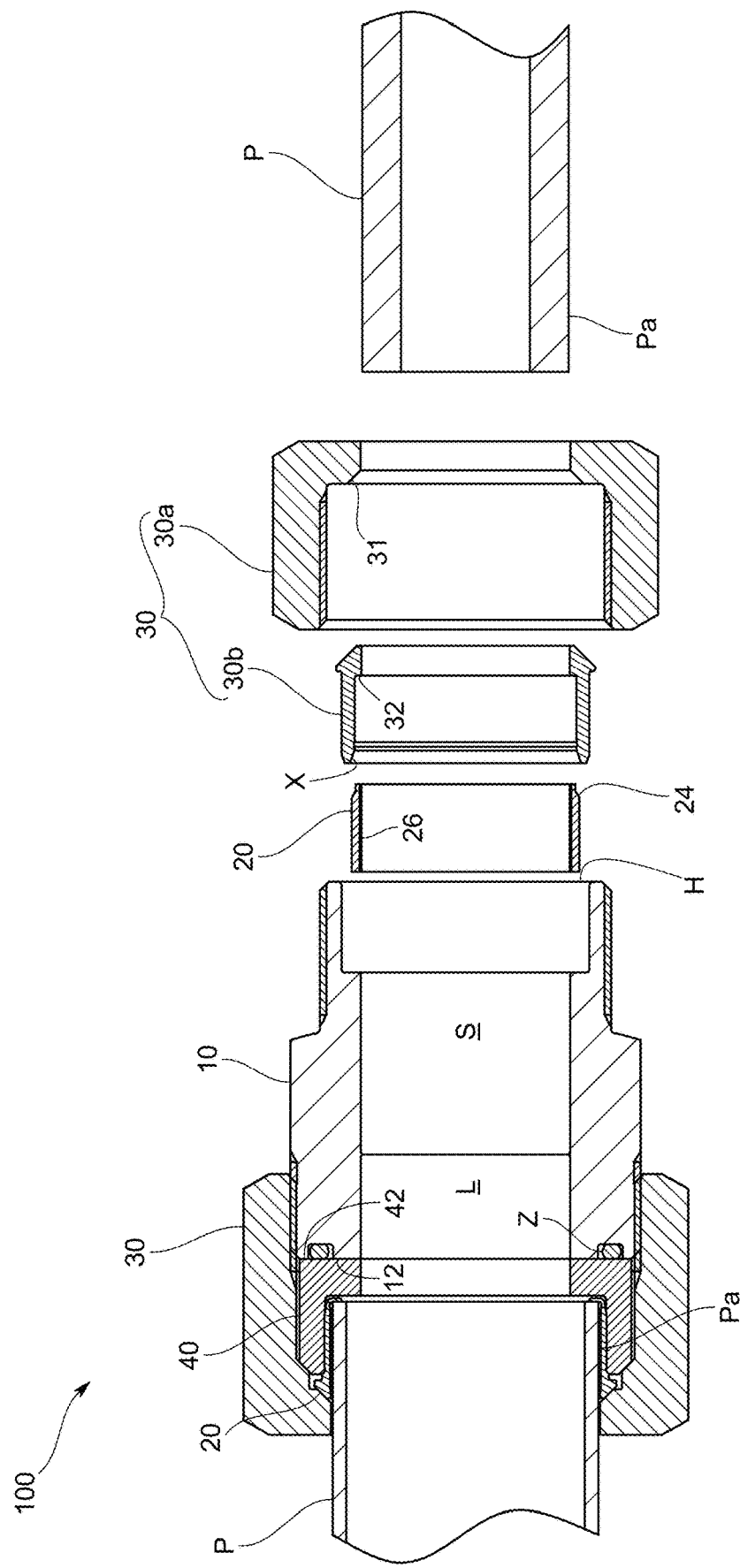
FIG. 9 is a cross-sectional view illustrating a configuration of a cylindrical member in another embodiment.
Figure 10:
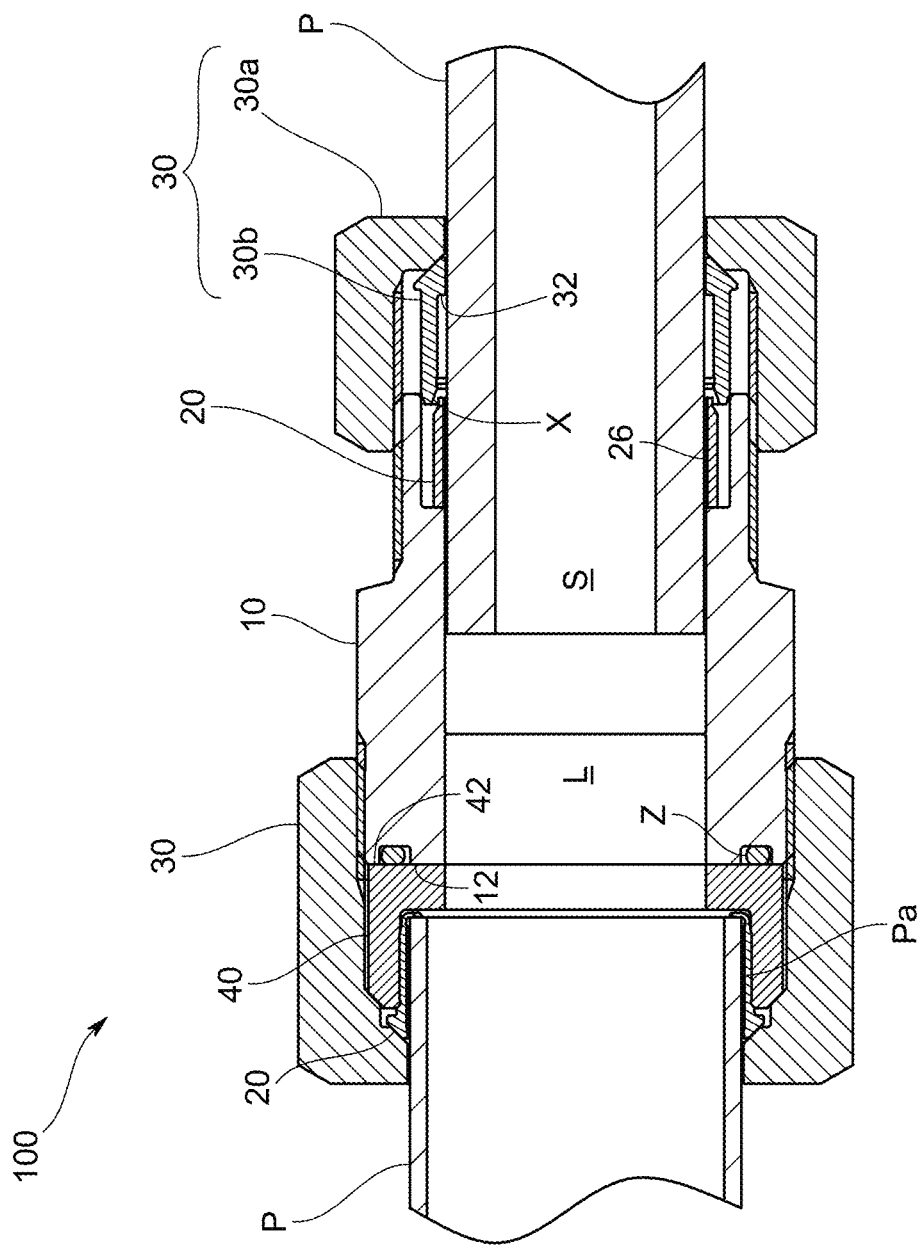
FIG. 10 is a cross-sectional view illustrating a state before connecting a pipe joint and a pipe member in another embodiment.
Figure 11:
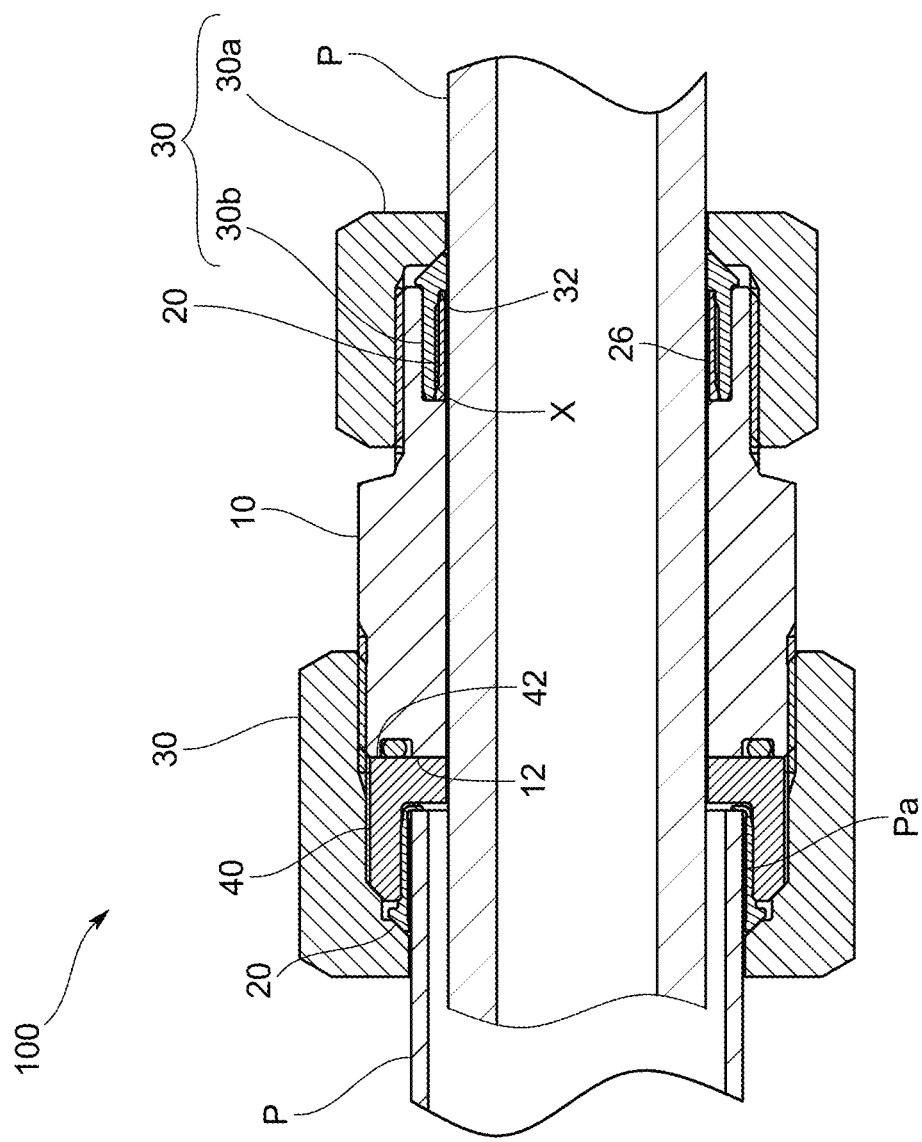
FIG. 11 is a cross-sectional view illustrating a state after connecting the pipe joint and the pipe member in the another embodiment.

A pushing member 30 may be a pushing member illustrated in FIGS. 9 to 11.

Specifically, the pushing member 30 further includes, in addition to a nut 30a in the above embodiment, a cylindrical moving body 30b that receives axial force from the nut 30a and presses a cylindrical member 20 toward a joint body 10.

The cylindrical moving body 30b has the inner diameter smaller than the outer diameter of the cylindrical member 20, and a step portion 32 is formed on an inner peripheral surface of the cylindrical moving body 30b so as to protrude radially inward and receive an end portion of the cylindrical member 20.

When this pipe joint 100 is used, as illustrated in FIG. 10, a pipe member P is first passed through the nut 30a, and then the cylindrical moving body 30b is mounted. The cylindrical member 20 is then mounted on the pipe member P. In this state, the pipe member P is inserted into a housing space S. The cylindrical moving body 30b is then pushed toward the joint body 10 with the nut 30a, and thus the cylindrical moving body 30b is press-fitted between the cylindrical member 20 arranged on an outer peripheral surface of a pipe end Pa and a housing surface 11 of the joint body 10.

With such a configuration, when the cylindrical moving body 30b is pushed by the pushing member 30, an axial position of the pipe member P is not restricted. Furthermore, as illustrated in FIG. 11, when the inner diameter of a left pipe member is larger than the outer diameter of a right pipe member, an axial mounting position of the right pipe member is not restricted at all, and thus a so-called double pipe structure is configured.

Figure 12:
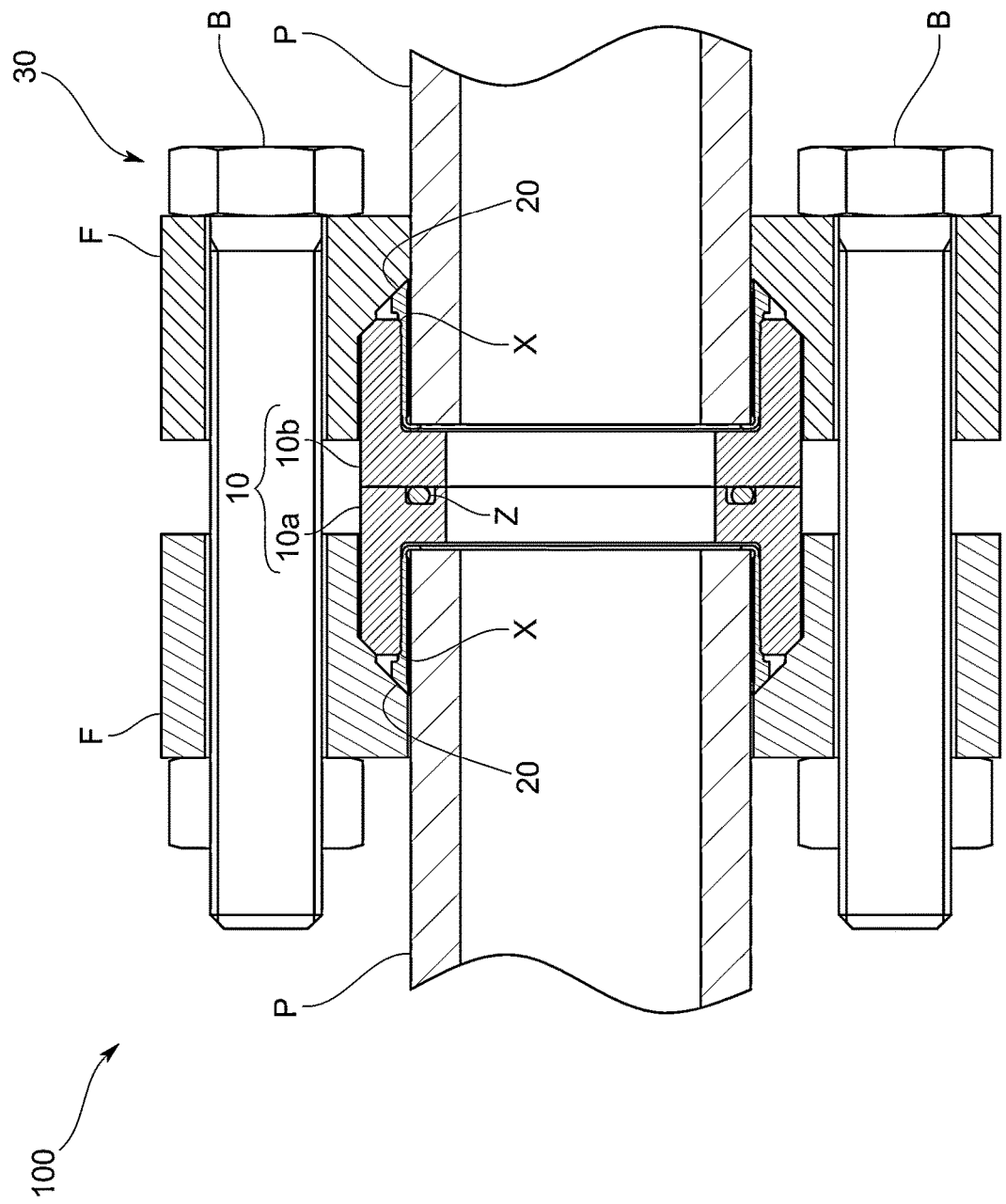
FIG. 12 is a cross-sectional view illustrating a configuration of a pushing member in another embodiment.

A pushing member 30 is not limited to the nut in the above embodiment, and may include, as illustrated in FIG. 12, flange portions F provided at respective pipe ends Pa of a pair of pipe members P and connecting portions B such as screws for connecting the flange portions F.

Specifically, cylindrical members 20 are fitted onto the pair of pipe members P, and the respective pipe ends Pa are inserted into housing spaces S. In this state, when the connecting portions B such as screws are inserted into a plurality of screw holes formed in the flange portions F and are tightened, the cylindrical members 20 can be pushed while a separation distance between the flange portions F is reduced.

Note that, in a first member 10 in a configuration of FIG. 12, the joint body in the above embodiment is divided into a first element 10a in which one housing space S is formed and a second element 10b in which another housing space S is formed, and facing surfaces of the first element 10a and the second element 10b are in close contact with each other via a sealing member Z such as an O-ring.

Figure 13A:
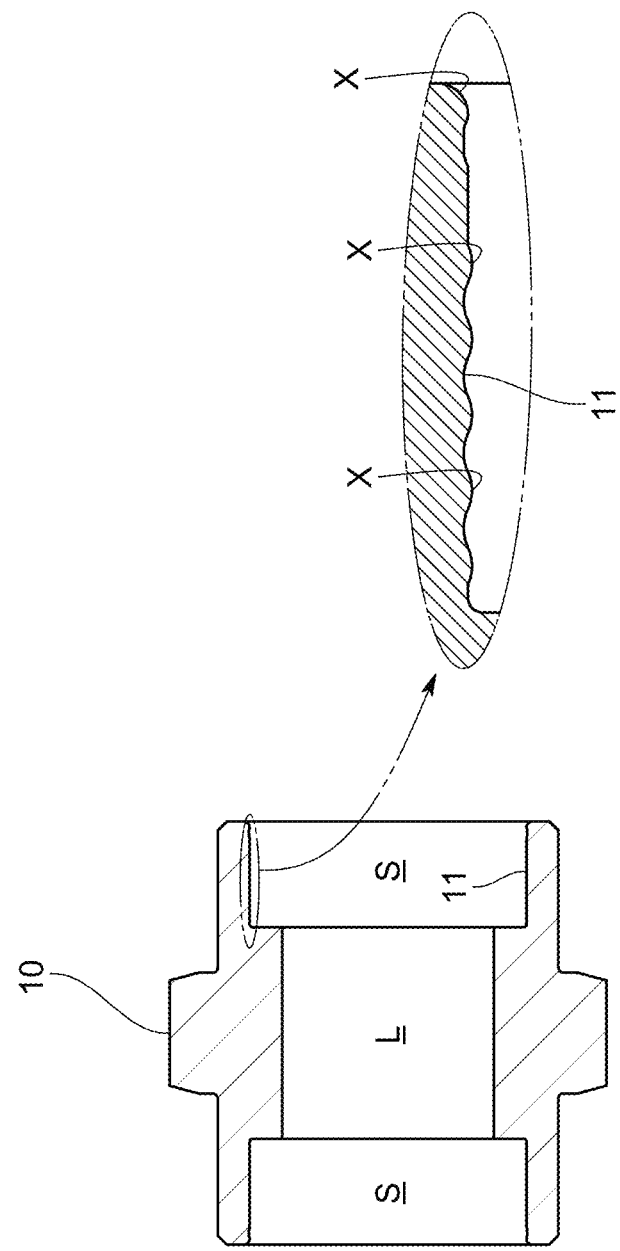
FIG. 13a is a cross-sectional view illustrating a configuration of an annular protrusion in another embodiment.

As illustrated in FIG. 13a, force concentrating portions X may be provided at a plurality of locations on a housing surface 11.

Figure 13B:
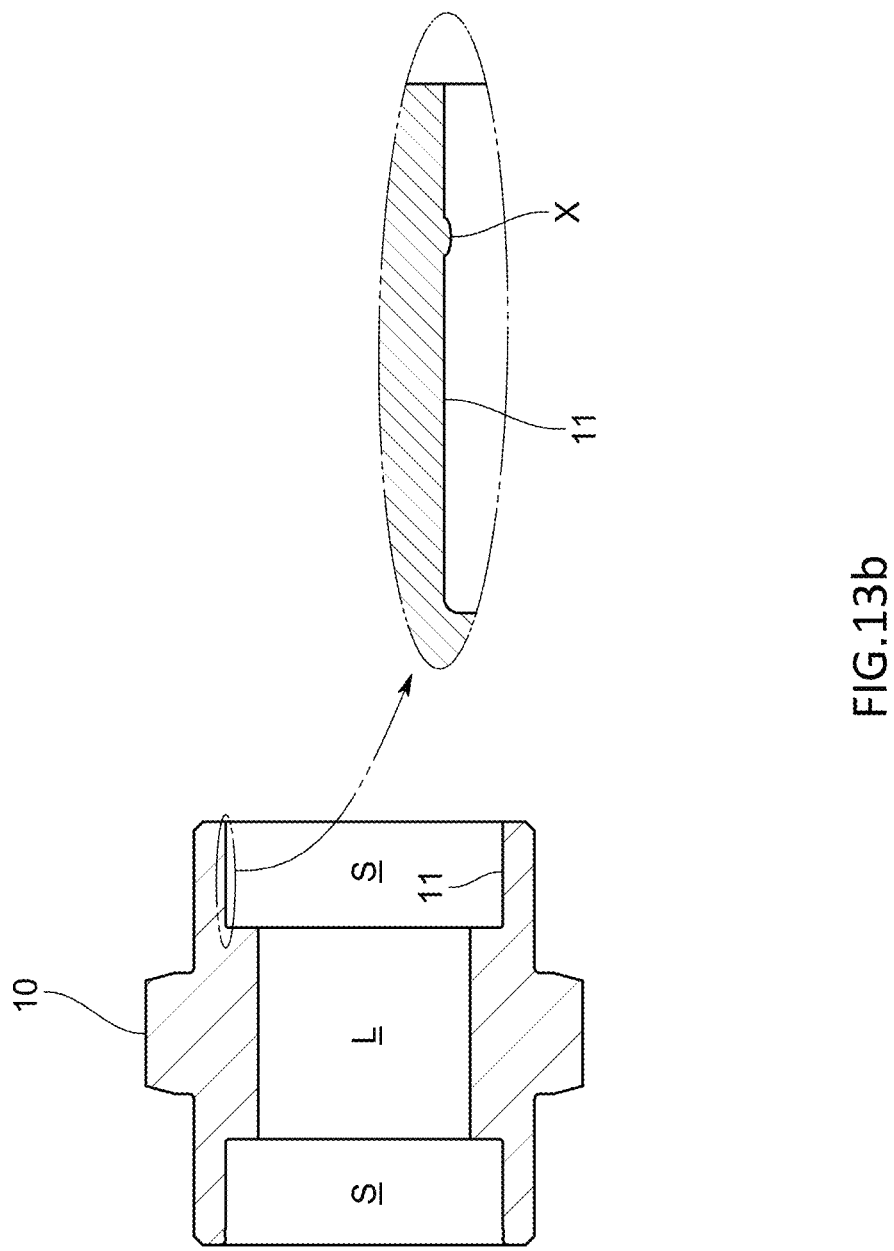
FIG. 13b is a cross-sectional view illustrating a configuration of an annular protrusion in another embodiment.

Furthermore, as illustrated in FIG. 13b, a position of a force concentrating portion X is not limited to the vicinity of an insertion port H on a housing surface 11, and the force concentrating portion X may be provided at a position away from the insertion port H on a side of a communication passage L.

Figure 14:
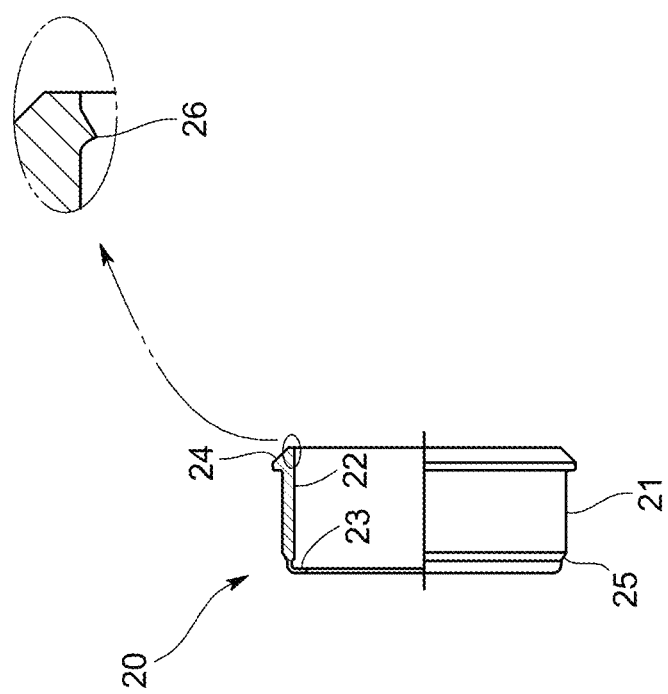
FIG. 14 is a cross-sectional view illustrating the configuration of an annular protrusion in another embodiment.

Although the plurality of annular protrusions 26 is provided on the inner peripheral surface 22 of the cylindrical member 20 in the above embodiment, one annular protrusion 26 may be provided on an inner peripheral surface 22 of a cylindrical member 20, as illustrated in FIG. 14.

Figure 15:
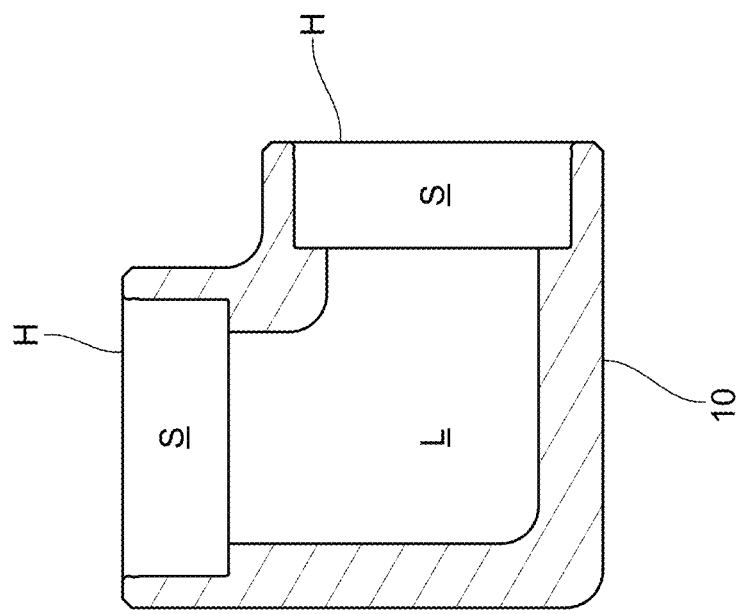
FIG. 15 is a cross-sectional view illustrating a configuration of a joint body in another embodiment.

Although the pipe joint 100 in the above embodiment is for connecting the pair of pipe members P having their pipe ends Pa facing each other, a pair of pipe members P may be connected in a state where a connecting space forms an L shape and directions of pipe ends Pa are orthogonal to each other, for example, as illustrated in FIG. 15.

Furthermore, although the pipe joint 100 in the above embodiment connects the pair of pipe members P, one side does not have to be a pipe member, and for example, a pipe joint 100 may be used to connect a port of a fluid device or the like and a pipe member P.

Figure 16:
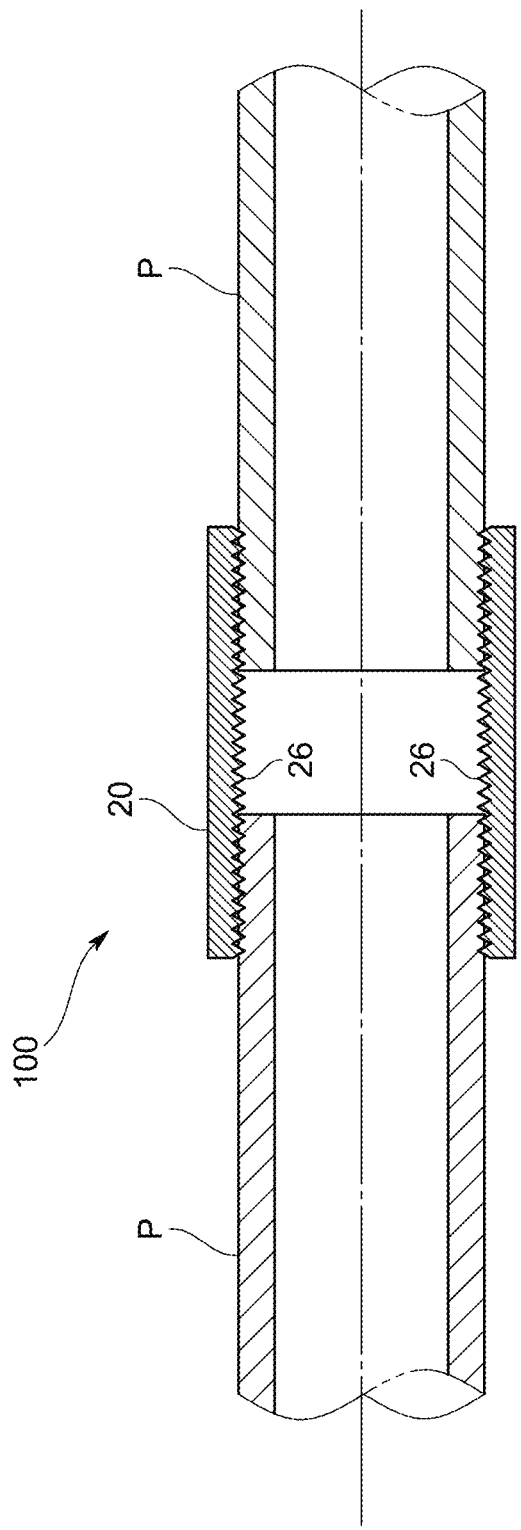
FIG. 16 is a cross-sectional view illustrating a joining structure between a pipe member and a cylindrical member in another embodiment.

Furthermore, as illustrated in FIG. 16, a pipe joint 100 is only required to be configured by use of at least a cylindrical member 20, and the joint body 10 and the pushing member 30 in the above embodiment are not necessarily required.

Figure 17:
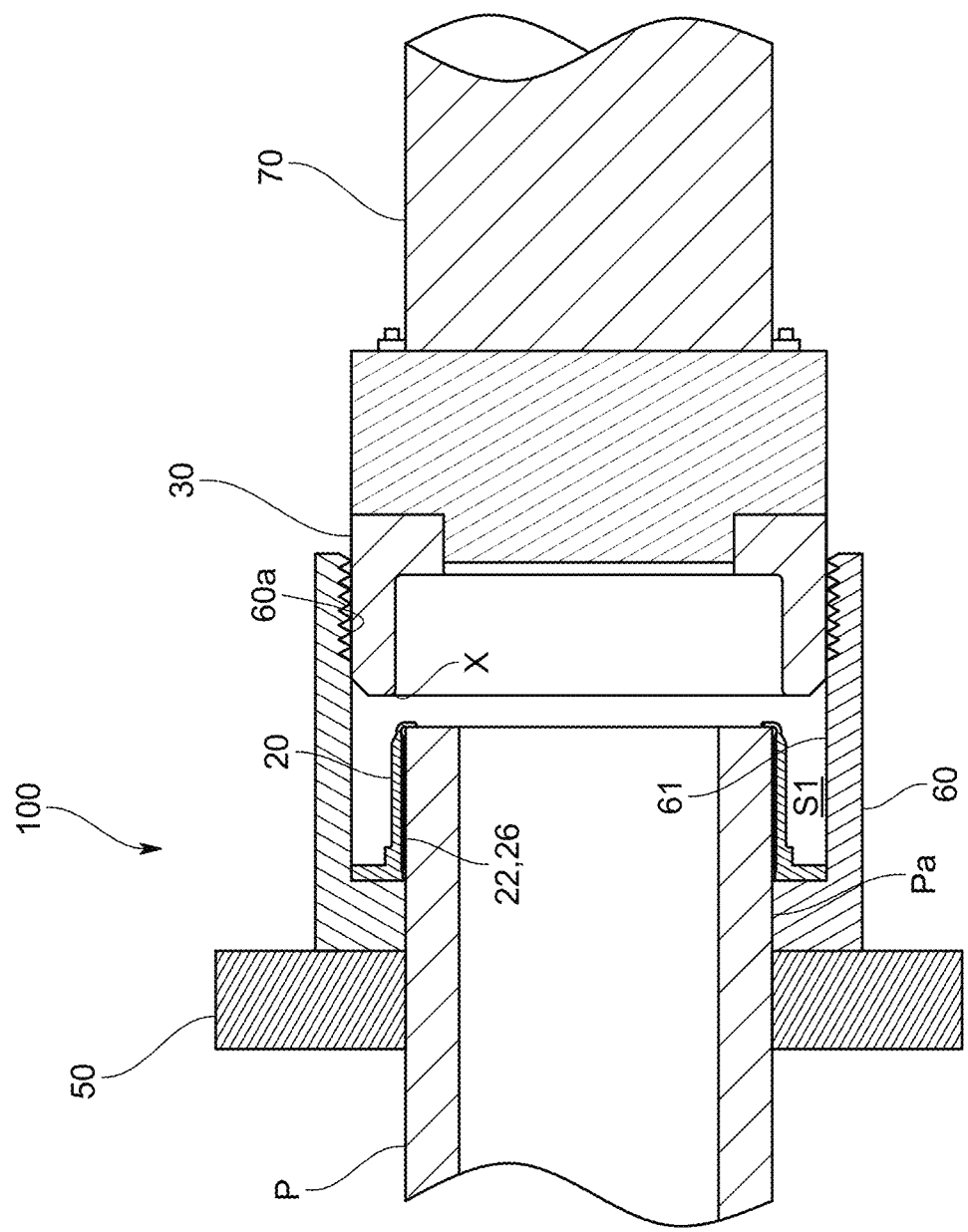
FIG. 17 is a schematic diagram for describing a use method of a pipe joint in another embodiment.
Figure 18:
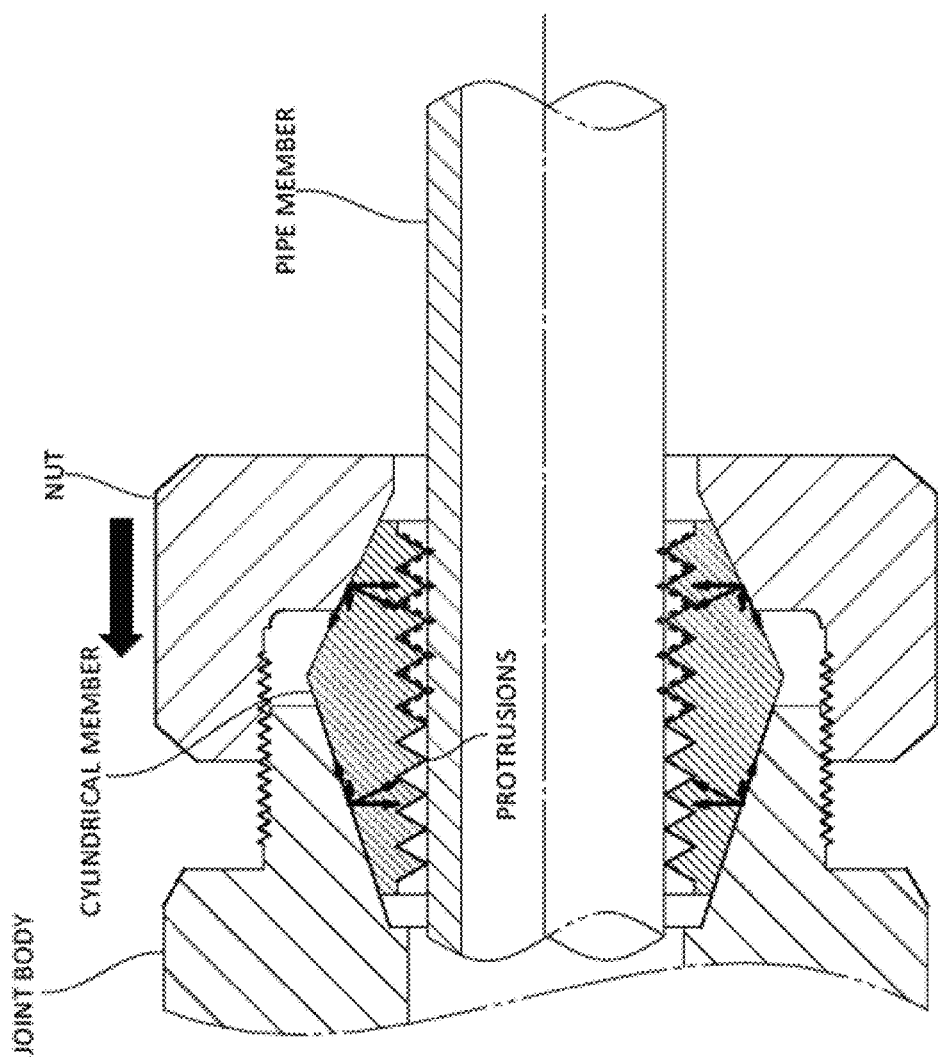
FIG. 18 is a schematic diagram for describing force acting on a cylindrical member when a conventional pipe joint is used.

Moreover, as illustrated in FIG. 17, if an annular protrusion 26 formed on an inner peripheral surface 22 of a cylindrical member 20 bites into an outer peripheral surface of a pipe member P in advance, a pipe joint 100 does not have to be provided with a pushing member 30.

More specifically, as illustrated in FIG. 17, first, the pipe member P onto which the cylindrical member 20 is fitted is fixed to a stopper 50. At this time, a pipe end Pa and the cylindrical member 20 are housed in a housing space S1 of a joint body corresponding member 60 corresponding to a joint body 10. In this state, the pushing member 30 prepared separately from the pipe joint 100 is pushed into an annular space between an outer peripheral surface 21 of the cylindrical member 20 and a housing surface 61 forming the housing space S1 by, for example, a hydraulic cylinder 70. Even in this case, axial force applied to the cylindrical member 20 by the hydraulic cylinder 70 is converted into radially inward force by a force concentrating portion X provided on an inner peripheral surface of the pushing member 30, and is concentrated on the outer peripheral surface 21 of the cylindrical member 20. As a result, the annular protrusion 26 bites into the outer peripheral surface of the pipe member P.

As described above, if the annular protrusion 26 bites into the outer peripheral surface of the pipe member P in advance, the pipe member P can be inserted deeply into a housing space S of the joint body 10, and thus tightening torque required to screw a nut to the joint body 10 can be made very small.

The above example illustrated in FIG. 17 shows that the pushing member 30 is integrally fixed with the joint body corresponding member 60 by being pushed (press-fitted) to the depth of the housing space S1 in an axial direction and then separated from a tip portion of the cylinder 70. Furthermore, a reference sign 60a indicates a threaded portion for joining. Note that, in this case, the joint body corresponding member 60 of the housing space S1 may not be provided. It is also possible to pull out the pushing member 30 while the pushing member 30 is fixed to the tip of the cylinder. When the pushing member 30 is pulled out, for example, the diameter of the pushing member 30 is increased in a radial direction by hydraulic pressure, so that pulling resistance can be reduced.

Figure 19:
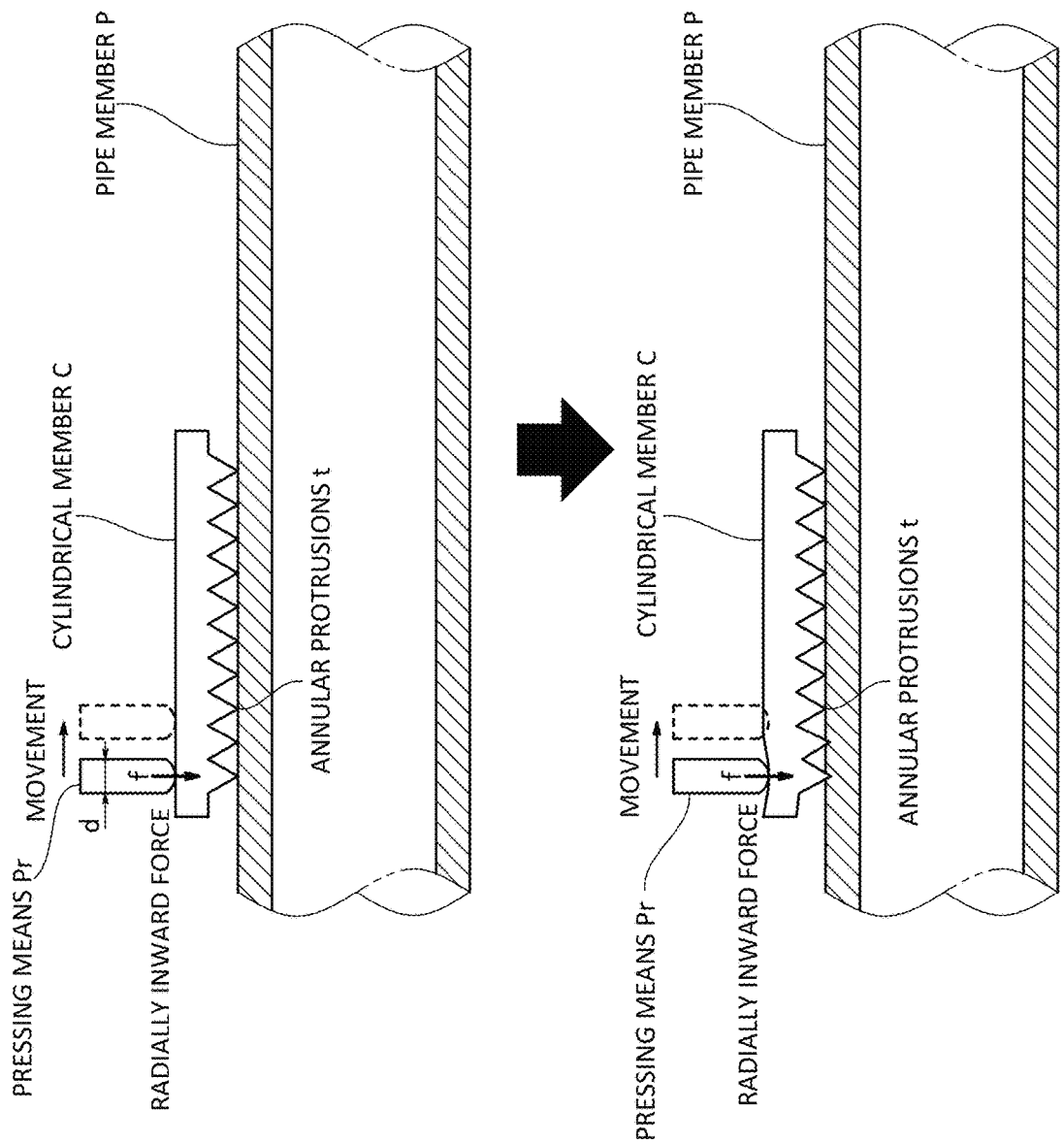
FIG. 19 is a schematic diagram for describing force acting on a cylindrical member when a pipe joint of the present invention is used.

In FIGS. 1 to 17 described above, an example is shown in which a press-fitting operation is mainly adopted as a pressing means Pr (see FIG. 19) for pressing the cylindrical member radially inward, but the pressing means of the present invention is not limited to such a press-fitting operation method. That is, as described above, the press-fitting operation method simultaneously generates radially inward pressing force as the pushing member such as a nut moves along the axial direction, but as illustrated in FIG. 19, generation of the radially inward pressing force and movement of the pressing means Pr in the axial direction may be performed at different timings. As such an example, a method using a known rolling roller (for example, JP H11-290980 A), a caulking method using a split die to reduce the diameter in the radial direction, and the like can be given.

In addition, the present invention is not limited to the above embodiment, and it goes without saying that various modifications can be made without departing from the spirit of the present invention.

REFERENCE SIGNS LIST 100 pipe joint
P pipe member
Pa pipe end
10 joint body (first member)
H insertion port
S housing space
L communication passage
11 housing surface
20 cylindrical member
21 outer peripheral surface
22 inner peripheral surface
23 stopper surface
24 pressed surface
25 tapered portion
26 annular protrusion
30 pushing member
31 pressing surface
X force concentrating portion

INDUSTRIAL APPLICABILITY

According to the present invention, it is possible to join a pipe member and a pipe joint more firmly than before without using welding, and reducing force required to push a cylindrical member makes it possible to use the pipe joint for connecting large-diameter pipe members.

The invention claimed is:

1. A pipe joint that is joined to a pipe member;
a first member in which a housing space for housing a pipe end of the pipe member is formed; and
a cylindrical member interposed between an outer peripheral surface of the pipe end and a housing surface, the housing surface being an inner peripheral surface of the first member forming the housing space, and
a pushing member that applies axial force to the cylindrical member, wherein
on a cross section parallel to an axial direction of the cylindrical member, a plurality of annular protrusions is provided on an inner peripheral surface of the cylindrical member along the axial direction;
the pipe joint is configured to generate radially inward force on the cylindrical member by an axial force applied by the pushing member;
the first member is formed with a force concentrating portion that concentrates the radially inward force on a part of the outer peripheral surface of the cylindrical member when moving along the outer circumferential surface of the cylindrical member, and
the force concentration portion crushes and deforms the cylindrical member at the location where the radially inward force is concentrated, and
as the force concentration portion moves along the outer circumferential surface of the cylindrical member, the plurality of annular protrusions bite into the outer circumferential surface of the tube member one by one along the axial direction,
the joining structure airtightly or liquid-tightly joining the outer peripheral surface of the pipe end and the inner peripheral surface of the cylindrical member, making the pipe member and the cylindrical member inseparable.

2. The pipe joint according to claim 1, wherein the force concentrating portion is a part of the housing surface and is a bulging surface that bulges radially inward.

3. The pipe joint according to claim 1, wherein the plurality of annular protrusions forms a spiral shape formed continuously or annular shapes formed discontinuously.

4. The pipe joint according to claim 1, wherein the pushing member includes a nut screwed to the first member, and
a cylindrical element that receives axial force from the nut and presses the cylindrical member toward the first member.

* * * * *